(12) United States Patent
Batterywala (10) Patent No.: US 7,904,690 B2
(45) Date of Patent: Mar. 8, 2011

(54) POLICY BASED STORAGE APPLIANCE VIRTUALIZATION

(75) Inventor: Yusuf Batterywala, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 572 days.

(21) Appl. No.: 11/963,617

(22) Filed: Dec. 21, 2007

(65) Prior Publication Data

US 2009/0157998 A1    Jun. 18, 2009

(30) Foreign Application Priority Data

Dec. 14, 2007   (IN) ........................... 3013/CHE/2007

(51) Int. Cl.
G06F 12/00    (2006.01)
(52) U.S. Cl. ...................................... 711/170
(58) Field of Classification Search .................. None
See application file for complete search history.

(56) References Cited

U.S. PATENT DOCUMENTS

| | | | |
|---|---|---|---|
| 6,993,539 B2 | 1/2006 | Federwisch et al. | |
| 7,146,522 B1 | 12/2006 | Rowe et al. | |
| 7,293,152 B1 | 11/2007 | Srinivasan et al. | |
| 2004/0030668 A1 | 2/2004 | Pawlowski et al. | |
| 2005/0246382 A1 | 11/2005 | Edwards | |
| 2007/0016822 A1* | 1/2007 | Rao et al. | 714/4 |
| 2007/0022314 A1 | 1/2007 | Erasani et al. | |

* cited by examiner

*Primary Examiner* — Hiep T Nguyen
(74) *Attorney, Agent, or Firm* — Perkins Coie LLP (57) ABSTRACT

An embodiment of the invention provides an apparatus and method for a policy-based storage appliance virtualization that identifies the storage space based on a desired storage management operation type. One example of a storage management operation type is the allocation of storage space from a storage appliance(s) to a host(s). The requested storage space amount to be allocated to a host is first specified in a management console. The management console checks one or more policies and compares the policies with the requested storage space amount and identity of the host, so that the management console identifies the storage space(s) that are available for allocation from a storage appliance(s) to the host. The management console may generate a candidate virtualized storage pool identification that identifies the storage space(s) that are available for allocation from the storage appliance(s) to the host. The server administrator then selects the storage space(s) to be allocated to the host. The policies may also be used as constraints to other storage management operation types besides the above-mentioned storage allocation to hosts.

34 Claims, 7 Drawing Sheets

POLICY BASED STORAGE APPLIANCE VIRTUALIZATION

This application claims priority to Indian Patent Application No. 3013/CHE/2007, filed on 18 Dec. 2007.

TECHNICAL FIELD

Embodiments of the invention relate generally to an apparatus and method for a policy based storage appliance virtualization.

BACKGROUND

A storage appliance is one type of computer that provides services relating to the organization and storage of information or data on storage devices such as, for example, disk drives ("disks"). In other words, a storage appliance is adapted to store and retrieve data on behalf of one or more client processing systems ("clients" or "hosts") in response to external requests received from the hosts. A storage appliance can provide clients with file-level access to data stored in the storage devices. A storage appliance can also provide clients with block-level access to stored data, or with both file-level access and block-level access. For convenience, a storage appliance will be described herein, for the most part, in terms of the former, though the description herein will have application to the latter types of storage appliances as well, as will be apparent to those of ordinary skill in the art in light of the description that follows. Examples of such storage appliances include, but are not limited to, a file server or another type of computing device that provides storage services using a file system to respond to file-oriented data access requests ("filer"). A storage appliance includes a storage operating system that implements the file system to logically organize the information as a hierarchical structure of directories and files on the disks. Each file on a disk may be implemented as a set of data structures, e.g., disk blocks, which are configured to store information. A directory may be implemented as a formatted file in which information by other files and directories is stored. The term "storage appliance" can broadly include any type of device that provides file services relating to the organization or storage of information on storage devices, such as disks. Examples of a storage appliance may include, but are not necessarily limited to, e.g., a filer or a file server or another type of computing device that provides file services.

An implemented disk storage for a storage appliance typically has one or more storage "volumes" which are a collection of physical storage disks and which define an overall logical arrangement of storage space. In other words, a storage volume is a logical container that includes a collection of disks. Therefore, the collection of disks are grouped (assimilated) into the storage volume. Each volume is generally associated with a file system.

A storage appliance may be further configured to operate according to a client/server model of information delivery in order to allow many hosts (client computers) to access files stored on a server. In this model, the host may include an application, such as a database application that executes on a computer that connects to the storage appliance over a computer network. This computer network could be, for example, a point to point link, a shared local area network (LAN), a wide area network (WAN), a virtual private network (VPN) implemented over a public network such as the Internet, storage area network (SAN), or other suitable networks. Each host may request the services of the file system on the storage appliance by issuing file system protocol messages (typically in the form of packets) to the storage appliance over the network.

One or more host computers (i.e., hosts or client computers) can share the storage resources (e.g., storage space) of storage appliances in a network. The process of allocating storage space to a host is known as "storage provisioning". As known to those skilled in the art, storage provisioning involves creating (allocating) a storage space in a storage appliance(s) and mapping the allocated storage space to a host. The host can access and use the storage space that has been allocated to the host. The same storage space can be allocated to different hosts, and as a result, the different hosts can use the same storage space. Different storage space can also be allocated to different hosts, so that each host is allocated with a unique storage space. A "storage administrator" is an administrator who performs various management tasks for managing the storage appliances in a network, including known management tasks such as, for example, the above-mentioned task of selecting the storage spaces that will be allocated from the storage appliances to the hosts.

A "server administrator" is an administrator who manages the above-mentioned hosts that can communicate with storage appliances. In current systems, a server administrators would make a request to a storage administrator(s) for storage space allocation so that the storage administrator can allocate the storage space to a host that is managed by the requesting server administrator. However, in current systems, the server administrator is required to know the name of a storage appliance and/or the name of a storage volume that will be allocated to a host. As the number of hosts and the number of storage appliances in a network continue to increase, the ease of network management will decrease for the server administrator because the administrator is required to know or remember a storage appliance name and a volume name when a host will be allocated storage space. This results in increased difficulty in the management of hosts by the server administrators. Additionally, current systems do not provide a management console (i.e., management server) that communicates with the hosts and storage appliances and that identifies the storage spaces that are to be allocated to the hosts. Therefore, improvements can be added to the current technology to ease the network management tasks for server administrators.

SUMMARY OF EMBODIMENTS OF THE INVENTION

An embodiment of the invention provides an apparatus and method for a policy-based storage appliance virtualization that identifies storage space based on a specified storage management operation type. One example of a storage management operation type is the allocation of storage space from a storage appliance(s) to a host(s). A server administrator can enter a command at a management console (or can access a host device that sends a command to the management console), where the command specifies the storage space amount to be allocated from a storage appliance(s) to a host(s) and specifies an identity of the host. The command also specifies the storage management operation type that the server administrator desires to perform. For example, this storage management operation type that the server administrator desires to perform is to allocate some storage space amount from a storage appliance(s) to a host(s) that are managed by the server administrator. Other examples of storage management operation types are also discussed below. The management console communicates with the host(s) and with the storage appliance(s) that will provide the storage space to be allocated to the host. The management console checks one or more policies in order to identify storage space that can be allocated to the host based upon the storage space amount and the host identity that are specified in the command, and compares the policies with the specified storage amount and the host identity. After the management console checks the policies and performs a comparison of the policies with the specified storage amount and host identity, the management console will identify the candidate storage appliances and/or candidate storage volumes that can provide storage space that can be allocated to the host. Storage space allocation methods that are known to those skilled in the art can then be used to allocate the storage space from the storage appliance to the host.

An embodiment of the invention advantageously provides a management console that permits a server administrator to manage the hosts (e.g., client computers) (that communicate with storage appliances (e.g., filers) in a network) with decreased difficulty and burden, because the management console will automatically identify the candidate storage appliances and/or candidate storage volumes that can provide storage space that can be allocated to the hosts. An embodiment of the invention advantageously eliminates the need for the server administrator to remember the names of storage appliances (e.g., filers) and names of storage volumes in the storage appliances, when the server administrator has to provision (allocate) the storage spaces for a host. The server administrator needs to only specify the requested storage space amount to be allocated to a host and the identity of the host. As a result, the server administrator will have an easier task of managing the hosts (that communicate with storage appliances (e.g., filers)) by use of a single user interface (e.g., graphical user interface).

Additionally, the storage administrator can add additional storage appliances (e.g., filers) in a network and add or modify the policies that determine the constraints for allocating storage space from the storage appliances to a host. A policy-based storage manager in an embodiment of the invention can then identify the candidate storage appliance (e.g., filer) and/or candidate storage volumes that can provide the storage space that is allocated to a host, based upon the policies that are set by the storage administrator. The storage administrator may also set a default policy that determines the storage appliance storage space allocation to a host, for any new storage appliance or new host that is added to the network.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

As discussed in additional details below, an embodiment of the invention provides an apparatus and method for a policy-based storage appliance virtualization that identifies the storage space that can be allocated to a host from one or more storage appliances. The storage space amount to be allocated to a host is first specified in a command, typically, by a server administrator. A server administrator is an administrator who manages one or more hosts that communicates with storage appliances, and a storage administrator is an administrator who manages the storage appliances. Other examples of storage management operation types that can be specified (in a command) by a server administrator are also discussed below. A management console checks one or more policies in order to identify storage space that can be allocated to the host, and compares the policies with the specified storage amount and the host identity. After the policies are checked, the management console may generate a candidate virtualized storage pool identification that identifies the storage space that can be allocated to the host.

As discussed in additional details below, an embodiment of the invention advantageously provides a management console that permits a server administrator to manage the hosts (e.g., client computers) and a storage administrator to manage storage appliances (e.g., filers) in a network with decreased difficulty and burden, as discussed in additional details below. An embodiment of the invention advantageously eliminates the need for a server administrator to remember the names of storage appliances (e.g., filers) and names of storage volumes in the storage appliances, when the server administrator has to provision (allocate) storage spaces for a host. The server administrator will have an easier task of managing the hosts and storage appliances (e.g., filers) by use of a single user interface (e.g., graphical user interface). The storage administrator can also add additional storage appliances (e.g., filers) in a network and add or modify the policies that determine the constraints for allocating storage space to a host. A policy-based storage manager in an embodiment of the invention can then select the appropriate storage appliance (e.g., filer) that will provide storage space that is allocated to a host, based upon the policies that are set by the storage administrator. The storage administrator may also set a default policy that determines storage appliance storage space allocation to a host, for any new storage appliance or new host that is added to the network.

Figure 1:
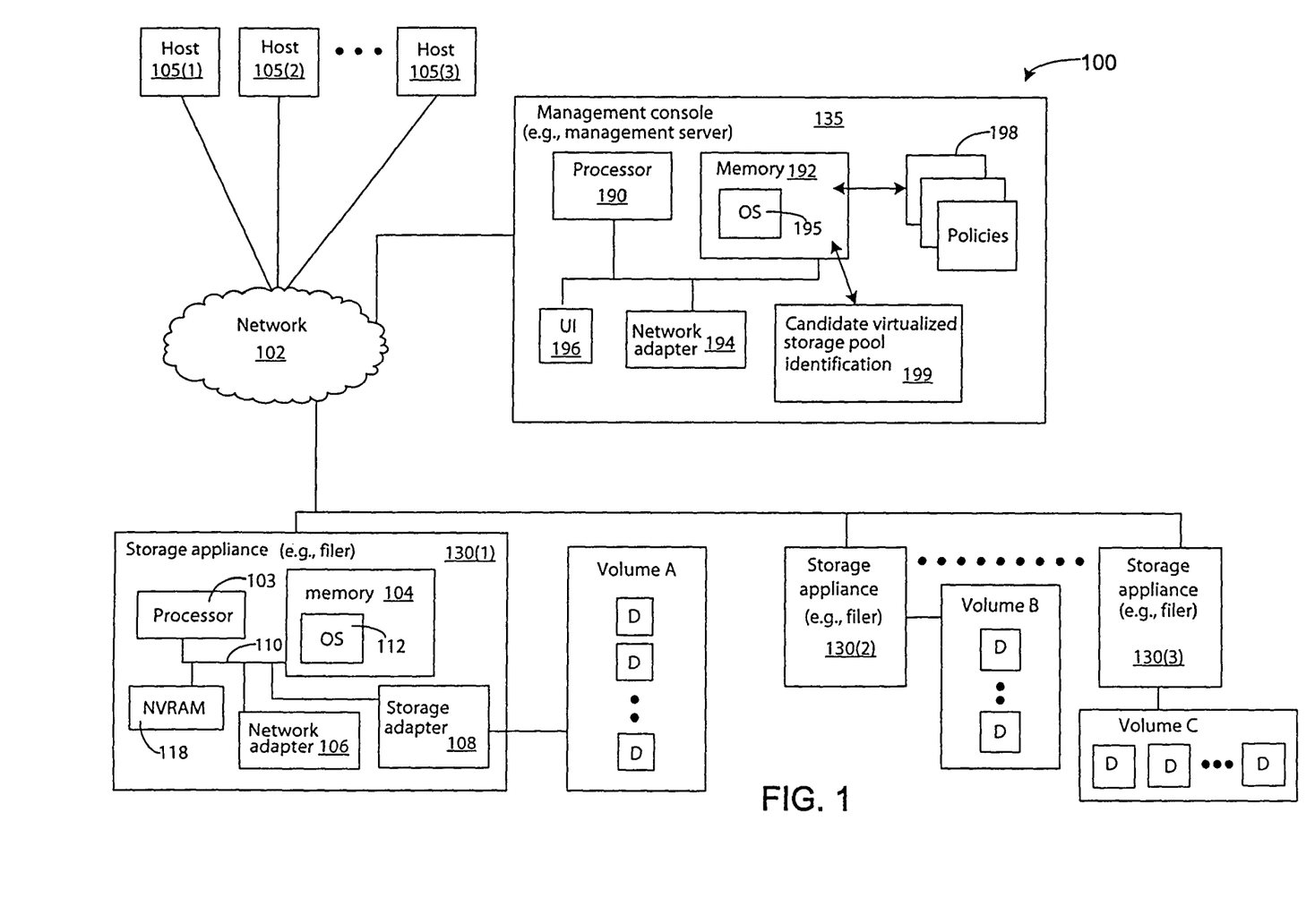
FIG. 1 is a block diagram of a system (apparatus), in accordance with an embodiment of the invention.

FIG. 1 is a block diagram of an apparatus (system) 100, in accordance with an embodiment of the invention. The apparatus 100 includes a network 102 which may be, for example, a local area network (LAN), a wide area network (WAN), virtual private network (VPN), a combination of LAN, WAN and VPM implementations, or another suitable communication network. For the purposes of this description, the term network should be taken broadly to include any acceptable networking architecture. One or more hosts are each connected to the network 102. In the example of FIG. 1, the hosts 105(1), 105(2), and 105(3) are connected to the network 102. However, the number of hosts connected to the network 102 may vary. Various other devices may also be optionally connected to the network 102 such as, for example, servers, network caches, switches, routers, and/or other suitable devices.

Each of the devices attached to the network 102 typically includes an appropriate conventional network interface arrangement (not shown) for communicating over the network 102 using a desired communication protocol such as, for example, Transport Control Protocol/Internet Protocol (TCP/IP), User Datagram Protocol (UDP), Hypertext Transfer Protocol (HTTP), Simple Network Management Protocol (SNMP), or other suitable protocols.

A storage appliance is a computer that provides file services relating to the organization or storage of information on storage devices, such as disks. Examples of a storage appliance include, but are not limited to a filer or a file server or another type of computing device that provides file services. Examples of currently available storage appliance products and associated software components are commercially available from, for example, NETWORK APPLIANCE, INC., Sunnyvale, Calif. or other vendors. In addition, it will be understood to those skilled in the art that the embodiments of the invention described herein may also apply to any type of special-purpose computer (e.g., server) or general-purpose computer, including a stand-alone computer, embodied as a file server. Moreover, the teachings of the embodiments of the invention can also be adapted to a variety of storage appliance architectures including, but not limited to, a network-attached storage environment, or a storage area network and disk assembly directly-attached to a client/host computer. The term "storage appliance" or "filer" or "file server" should therefore be taken broadly to include such arrangements.

In the system 100, the storage appliances 130(1), 130(2), and 130(3) are shown. However, the number of storage appliances in the system 100 may vary. The storage appliance 130(1) includes a processor 103, a memory 104, a network adapter 106 and a storage adapter 108 interconnected by a system bus 110. The storage appliance 130(1) also includes a storage operating system 112 that implements a file system to logically organize the information as a hierarchical structure of directories and files on a disk. Additionally, a persistent storage device 118 such as, for example, a non-volatile RAM (NVRAM) 118 is also typically connected to the system bus 110. Although NVRAMs are shown in FIG. 1, any suitable persistent storage device that retains content in the event of a power failure or other system failure can be used in place of the NVRAMs. An example of a suitable persistent storage device is a battery-backed RAM, although other suitable storage devices may also be used.

In an illustrative embodiment, the memory 104 may have storage locations that are addressable by the processor 103 for storing software program code or data structures for use in the functions of the storage appliance 130(1). The processor 103 and adapters 106 and 108 may, in turn, include processing elements and/or logic circuitry configured to execute the software code and manipulate the data structures.

The storage operating system 112, portions of which are typically resident in memory 104 and executed by the processing elements, functionally organizes a storage appliance by inter-alia invoking storage operations in support of the file services that are implemented by the storage appliance. It will be apparent by those skilled in the art that other processing and memory implementations, including various computer readable media may be used for storing and executing program instructions pertaining to the inventive techniques described herein.

The network adapter 106 includes the mechanical, electrical, and signaling circuitry for connecting the storage appliance 130(1) to other devices over the computer network 102 or connecting the storage appliance 130(1) to one or more other storage appliances (e.g., storage appliances 130(2) and 130(3)). A host (e.g., host 105(1) and generally host 105) can be a general-purpose computer configured to execute applications including file system protocols such as, for example, the Network File System (NFS) or the Common Internet File System (CIFS) protocol or other suitable protocols. Moreover, the host can interact with the storage appliances 130(1) to 130(3) in accordance with the known client/server model of information delivery.

The storage adapter 108 cooperates with the storage operating system 112 in order to access information requested by a host 105. The information may be stored in a number of storage volumes (e.g., Volume A). The number of storage volumes that is accessed by the storage appliance 130(1) may vary. Each storage volume is constructed from an array of physical disks D that are typically organized as RAID disk groups. The RAID disk groups include independent physical disks including those storing a striped data and those storing separate parity data. The number of disks in a storage volume and in a RAID disk group may vary.

The storage adapter 108 includes input/output interface circuitry that couples to the disks over an I/O interconnect arrangement such as, for example, a conventional high-speed/high-performance fibre channel serial link topology. The information is retrieved by the storage adapter 108, and may be processed by the processor 103 (or the adapter 108 itself) prior to being forwarded over the system bus 110 to the network adapter 106, where the information is formatted into a packet and returned to a host 105.

To facilitate access to the disks, the storage operating system 112 typically implements a file system that logically organizes the information as a hierarchical structure of directories in files on the disks. Each file on a disk may be implemented as a set of disk blocks configured to store information such as text or other format. The directory may be implemented as a formatted file in which other files and directories are stored. The storage operating system 112 associated with each volume is, for example, the Data ONTAP® storage operating system which is commercially available from NETWORK APPLIANCE, INC. The Data ONTAP storage operating system implements a Write Anywhere File Layout (WAFL)® file system. However, it is expressly contemplated that the principles of embodiments of this invention can be implemented using a variety of alternate storage operating system architectures. Additional details on the functions of an example storage operating system 112 is disclosed in, for example, commonly-assigned U.S. patent application Ser. No. 10/836,090, which is hereby fully incorporated herein by reference. Additional details of an example storage appliance are disclosed in, for example, commonly-assigned U.S.

patent application Ser. No. 10/215,917, which is hereby fully incorporated herein by reference.

Each of the other storage appliances 130(2) and 130(3) also includes the above-described similar components that are in the storage appliance 130(1), but are not shown in FIG. 1 for purposes of clarity.

In an embodiment of the invention, a management console 135 is also connected to the network 102 and can communicate with each of the storage appliances 130(1) to 130(3). The management console 135 is typically, for example, a management server or other computing device that can perform the various computing operations that are discussed below in additional details. Typically, the management console 135 will include a processor 190, memory 192, operating system 195, and network adapter 194. The details of these components have been previously discussed above.

As discussed below in further details, the management console 135 will check one or more policies 198 which determine the storage appliances (e.g., filers) that can be used to allocate storage space for a particular host. In other words, the policies 198 will set the constraints on provisioning of storage space from the storage appliances 130 to the hosts 105. Examples of these constraints on provisioning of storage space to the hosts 105 are discussed below. The management console 135 can also generate a candidate virtualized storage pool identification 199 that identifies the storage space that can be allocated for a particular host. The candidate virtualized storage pool identification 199 may identify one or more storage appliances or/and one or more storage volumes from at least one storage appliance. As an option, the identification 199 can be in a priority order (e.g., decreasing priority), as discussed in additional details below in FIG. 3B. For example, if storage appliance (e.g., filer) 130(1) is the highest priority as determined by a policy 198, then the storage appliance 130(1) is listed first in the identification 199.

Figure 2:
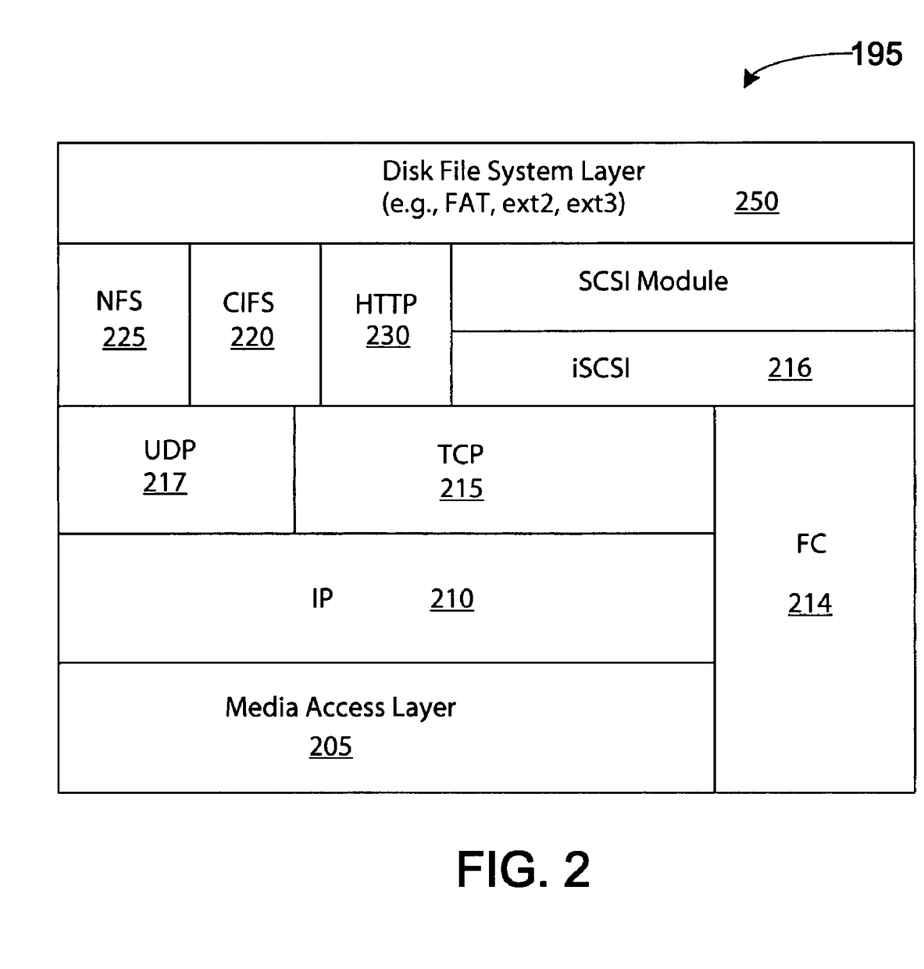
FIG. 2 is a block diagram of an exemplary storage operating system that can be used in an embodiment of the invention.

FIG. 2 is a block diagram of an exemplary operating system 195 that may be used with the management console 135 of FIG. 1, in accordance with an embodiment of the invention. However, it is expressly contemplated that the principles of embodiments of this invention can be implemented using a variety of alternate operating system architectures. The exemplary operating system 195 includes various software layers and a media access layer 205 of network drivers (e.g., an Ethernet driver). The media access layer provides the hardware to permit connection by the console 135 to the network 102. Additionally, the software layers in FIG. 2 will typically run on top of an OS subsystem that perform standard operating system management tasks such as, for example, an OS subsystem in commercially available operating systems such as, e.g., the Linux® OS or Windows® type operating systems.

The operating system 195 further includes network protocol layers, such as the Internet Protocol (IP) layer 210. The IP layer 210 includes supporting transport mechanisms, such as the Transport Control Protocol (TCP) layer 215 and the User Datagram Protocol (UDP) layer 217. A disk file system protocol layer 250 provides multi-protocol data access and, to that end, includes support for the CIFS (Common Internet File System) protocol 220, the NFS (Network File System) protocol 225, and the Hypertext Transfer Protocol (HTTP) protocol 230. The disk file protocol layer 250 supports known disk file systems that can run on computing devices. Examples of known disk file systems include, but are not limited to, FAT (File Allocation Table), ext2, and ext3. In addition, the operating system 195 typically includes a SAN (storage area network) layer for serving data through SAN protocols such as, for example FCP (fibre channel protocol) 214 or iSCSI (internet small computer system interface) 216. The OS 195 also typically includes an SCSI module that supports the SCSI standard for system-level interfacing between the management console 135 and other devices. The protocols discussed above are known to those skilled in the art.

Generally, the file system layer 250 implements a file system having an on-disk format representation that is block-based using, e.g., 4-kilobyte (KB) data blocks and using inodes to describe the files. In response to transaction requests, a process of the file system layer generates operations to request and receive data from the storage appliances 130, if the operating system 195 is implemented in a host 105.

The communications between the hosts 105 and the management console 135, and the communications between the management console 135 and the storage appliances 130 can be performed by use of suitable known communication protocols that permits communications between computers in a network or a proprietary protocol that permits communications between computers in a network. If the operating system 195 is implemented in a host 105, the host will communicate with a storage appliance 130 for accessing storage space in the storage appliance 130. The host can use, for example, the CIFS/NFS protocol or the HTTP protocol for accessing storage space in a storage appliance 130.

The server administrator can also enter commands into a user interface 196 (FIG. 1) of the management console 135, in order to enable the management console 135 to perform various operations that are discussed below. The user interface 196 can be any suitable standard interfaces such as, for example, a keyboard, touch-screen, and/or any other device that can receive input commands from a user.

Figure 3A:
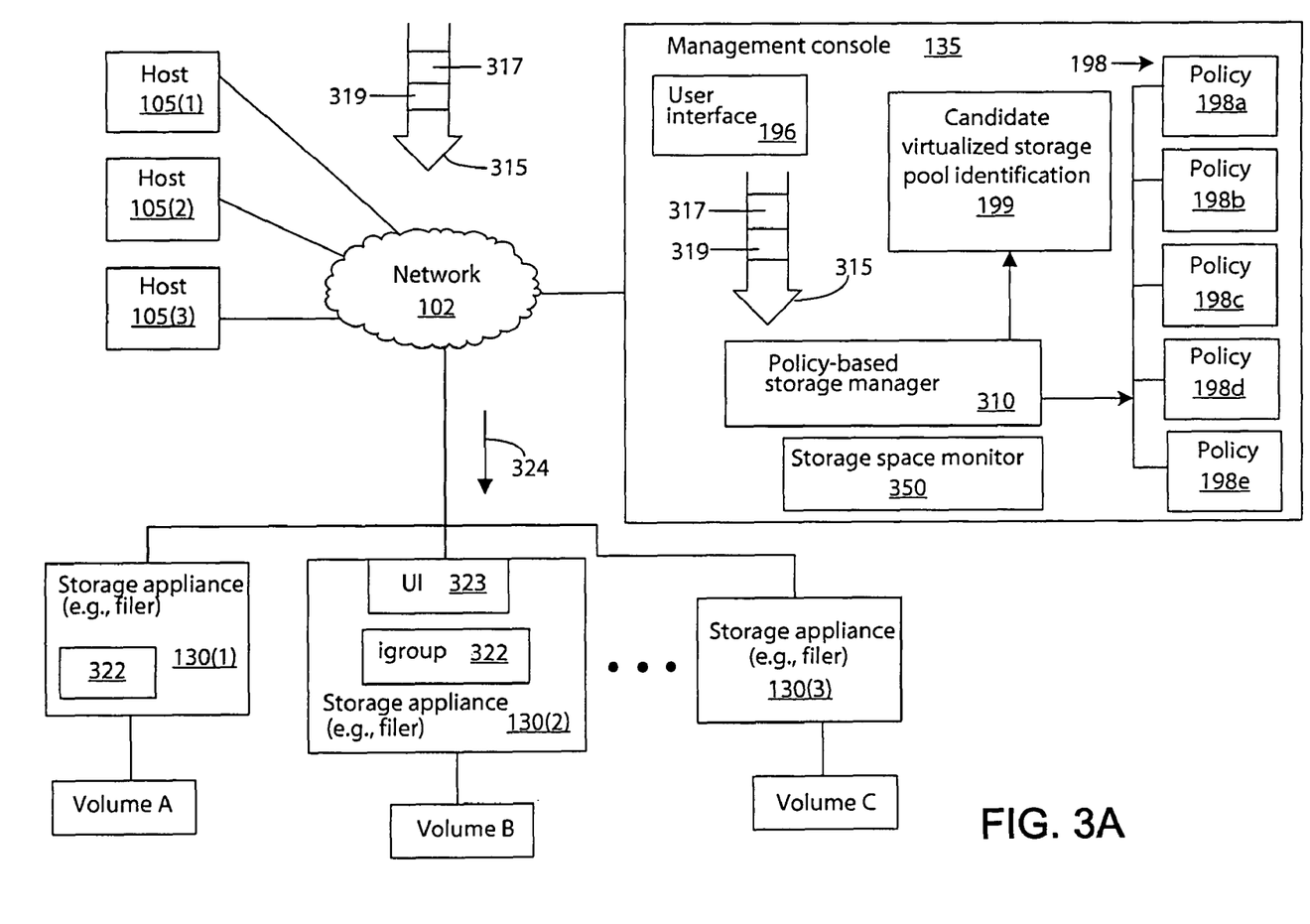
FIG. 3A is a block diagram that shows additional details of an embodiment of the invention.

FIG. 3A is a block diagram that shows additional details of an embodiment of the invention. The pool of storage appliances (e.g., filers) 130(1) through 130(3) provides a virtualized storage pool that will provision storage space to the hosts 105(1) to 105(3). The storage pool is virtualized to a server administrator (who manages one or more host) because the administrator is not required to have knowledge of the particular names of storage appliances and the particular names of storage volumes that will allocate storage space from the storage pool to a host. As also noted above, the number of hosts and storage appliances in FIG. 3A may vary. If the server administrator wants to provision storage space from a particular storage appliance 130 for a host 105, then: (1) the server administrator can send the storage provision request 315 from any host (e.g., host 105(1)) to the management console 135, or (2) the administrator can input a storage provision request 315 into the management console 135. The administrator is only required to specify, in the request 315, the storage space amount that will be provisioned from each particular storage appliance to the host(s). As discussed below, the policies 198 determine the appropriate storage appliance(s) (or appropriate storage appliance(s) and storage volume(s) in the appropriate storage appliance(s)) that will be used to provision the storage space for a particular host(s) 105.

The server administrator then provisions the storage space from the storage appliance(s) to the host(s) by use of known suitable storage provisioning methods. Storage provisioning involves pre-allocating and assigning storage space (in one or more storage appliances) to a host, so that the host can access and use that storage space.

Storage provisioning is performed by, for example, the use of initiator groups (igroups) 322 which are implemented in, for example, commercially available storage appliance products from NETWORK APPLIANCE, INCORPORATED.

However, other known storage provisioning methods or products may also be used. An initiator group 322 will limit the access of hosts 105 to a storage appliance 130 as discussed below. Additional details on igroups 322 are also disclosed in, for example, commonly-assigned U.S. patent application Ser. No. 10/421,576, entitled CONSISTENT LOGICAL NAMING OF INITIATOR GROUPS, which is hereby fully incorporated herein by reference. An igroup 322 is a group of node (host) names used for access control to a storage appliance. A host name is a unique identifier for a host, including unique identifiers such as, e.g., an iSCSI node name of the host or WWPN (world wide port name) of the host. Each igroup 322 is typically associated with a single host, and a storage appliance can have more than one igroup 322. If a particular host is not listed in any igroups in a storage appliance, then that host will not be able to access any storage space (e.g., LUN) in that storage appliance. A LUN (logical unit number) is a logical representation of a physical unit of storage. A LUN is a collection of, or a part of, physical or virtual disks configured as a single disk. When a LUN is created in a storage appliance, the LUN is automatically striped across many physical disks. Additional details on methods for permitting an administrator to create a LUN in a storage appliance are disclosed in, for example, commonly-owned U.S. patent application Ser. No. 11/187,729, which is hereby fully incorporated herein by reference. If a host belongs to an igroup 322, but a storage space (e.g., LUN) is not mapped to that igroup 322, then the host will not be able to access that storage space. A LUN is identified in the igroup 322 based on its LUN identifier (ID). If the host is in one or more particular igroups 322 in the storage appliance, then the host can access only the storage spaces (e.g., LUNs) that are mapped to those particular igroups 322 in which the host belongs. By mapping storage spaces (e.g., LUNs) to the hosts listed in the initiator group, these listed host will be able to access these mapped storage spaces.

An administrator (e.g., server administrator or storage administrator) can set the host names in the igroups 322 and the storage spaces that are mapped to the igroups 322 by issuing input commands 324 at the user interface 323 of a storage appliance, or by opening a session (e.g., Telnet, rsh, etc.) from a host to the storage appliance so that the input commands 324 are transmitted from the host to the storage appliance. Therefore, storage spaces are allocated from a storage appliance(s) to a host(s) by limiting the access of the hosts to particular storage spaces in the storage appliance as determined by the above-discussed igroups 322. An example of the steps for provisioning storage space in a storage appliance for a host is disclosed in commonly-assigned U.S. Pat. No. 7,146,522, by Alan L. Rowe, et al., entitled "System And Method For Allocating Spare Disks In Networked Storage", filed 21 Dec. 2001, which is hereby fully incorporated herein by reference. The storage provisioning capability is also implemented in storage appliance products that are commercially available from NETWORK APPLIANCE, INCORPORATED. However, as mentioned above, other known storage provisioning techniques for allocating storage space from a storage device(s) to a host(s) may be used in an embodiment of the invention.

The policies 198 are values or parameters that are set in a data structure by an administrator. The policies 198 may be set by use of the user interface 196 and by use of known software languages (e.g., C or C++) and known software programming techniques that can set the values or parameters in the data structures that implement the policies 198. The user interface 198 may be, for example, a graphical user interface (GUI).

The policy-based storage manager 310 may be implemented in software by use of known programming languages (e.g., C or C++) and may be programmed by use of known programming techniques. Additional details on the policy-based storage manager 310 are discussed below with reference to FIG. 3B.

When a server administrator will allocate storage space to a host, the following occurs. The server administrator initiates the sending of a request (command) 315 which indicates the storage space amount that will be allocated from a storage appliance(s) to a particular host. As mentioned above, the request 315 can be sent by a host 105 to the management console 135 or by input by the server administrator directly into the management console 135. The server administrator can indicate the storage space amount and the particular host, by use of a host itself or by use of the user interface 196 in the management console 135. For example, the request (command) 315 indicates, for example, that 100 gigabytes of storage space will be allocated for host 105(1). The field 317 indicates the storage space to be allocated for the host 105(1) and the field 319 in the request (command) 315 identifies the host 105(1) that will be allocated the storage space. When the server administrator uses a host (e.g., host 105(1)) to send the request 315, the source address of the request 315 will indicate the identity of the host 105(1). When the server administrator uses the management console 135 to send the request 315, the administrator will typically specify the host identity in the field 319 of the request 315 by use of the user interface 196.

The policy-based storage manager 310 receives the request 315. The manager 310 decodes (e.g., parses) the request 315 so that the manager 310 can determine the requested storage space amount to be allocated for a host and the identity of the host to be allocated the storage space. Additional details on the manager 310 are discussed below with reference to FIG. 3B. The manager 310 then checks the policies 198 to determine the proper storage appliance 130 and the proper storage volume (or proper LUNs in the storage volumes) in a storage appliance 130 to can be allocated to the host 105(1), based on the requested storage space amount and host identity in the request 315. The manager 310 may generate a candidate virtualized storage pool identification 199 that identifies one or more storage appliances or/and (one or more storage volumes and associated storage appliances) that are permitted to provide storage space that can be allocated to the host 105(1). The administrator can view the identification 199 to view the proper storage space allocation to hosts. Therefore, the identification 199 may present options of storage appliances and/or storage volumes (or LUNs) that the server administrator can select for provisioning storage space to the hosts. The options in the identification 199 satisfy the requested storage space amount for a host and the constraints that are set in the policies 198. Example constraints in the policies 198 are discussed below.

If the server administrator sends the request 315 from the host 105 to the management console 135, then the policy-based storage manager 310 can reply to the request 315 by transmitting a data packet (that includes the identification 199) to the requesting host 105. The manager 310 can use standard packet packaging techniques to create and transmit a data packet with the identification 199. The requesting host 105 receives the data packet and can use standard packet parsing techniques to parse the data packet so that the server administrator can view the identification 199 in an interface (e.g., screen) of the host.

The server administrator can then allocate the proper storage space from a storage appliance(s) to the hosts by use of known storage provisioning techniques such as, e.g., using the igroups 322 in storage appliances in order to limit the access of hosts to particular storage spaces in the storage appliances as discussed above.

Alternatively, the server administrator just needs to select from the options presented in the identification 199. Storage space will be provisioned from the selected storage appliance (s) in the selected options by the storage manager 310 by using standard techniques such as creating the igroup on the selected storage appliance and mapping the host to that igroup. Therefore, the server administrator selects an option in the identification 199 that is detected by the manager 310. In response to this selected option, the manager 310 sends the commands 324 (which have been discussed above) that creates or sets an igroup in a storage appliance, so that the host is mapped to the igroup. The details on creating and on setting of igroups are disclosed in, for example, the above-mentioned commonly-assigned U.S. patent application Ser. No. 10/421, 576.

Figure 3B:
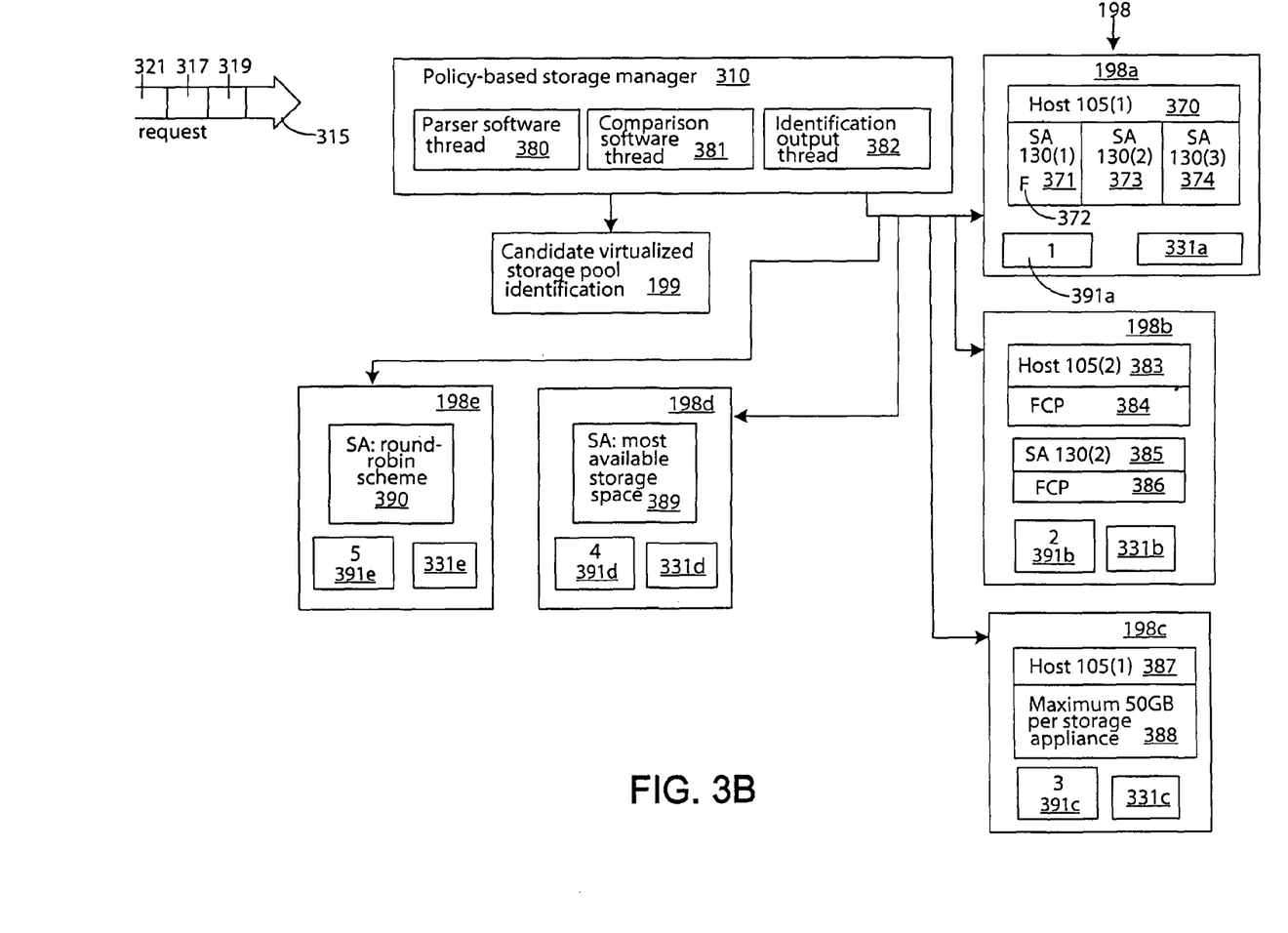
FIG. 3B is a block diagram that shows additional details of an embodiment of the invention.

As an example, assume that policy 198*a* permits the host 105(1) to be allocated storage space only on the storage appliance 130(1). FIG. 3B shows example representations of data structures for the example policies 198. In policy 198*a*, the data structure field 370 contains data structure values to identify the host 105(1). The data structure fields 371, 373, and 374 contain data structure values to identify the storage appliance (SA) 130(1), SA 130(2), and SA 130(3), respectively. The field 371 contains, for example, a flag value 372 to indicate that the host 105(1) is to be allocated storage space only on the storage appliance 130(1). Therefore, the values may be set in the data structure fields in FIG. 3B in order to set the constraints for allocating storage space to a host. Any suitable data structure with values that can be set or varied may be used to implement the policies 198. As the number of hosts and storage appliances (e.g., filers) increases in a network 100, a server administrator incurs greater burden and difficulty to manage the hosts in the network 100. The policies 198 permit a storage administrator to set constraints on storage allocation to hosts. The polices 198 also allow the server administrator to allocate storage spaces to hosts without the need to remember the particular host names, storage appliance names, storage volume names, limits on storage size allocation for particular storage appliances, and particular constraints on particular hosts and storage appliances. Since the server administrator is not required to remember the storage appliance names, volume names, and information relating to storage space allocation constraints, the storage appliances are virtualized to the server administrator and to the hosts.

A parser software thread 380 in the policy-based storage manager 310 can parse the request 315 and then determine the requested storage space amount to be allocated for a host (and the identity of the host to be allocated the storage space), by parsing the request 315. The parser software thread 380 can use known methods for parsing the requests or data packets transmissions. As known to those skilled in the art, software threads are routines that allow a computer program to perform an intended operation.

A comparison software thread 381 in the policy-based storage manager 310 reads the data structure values in the policies 198 and the values in the request 315 in order to determine the constraints in the policies 198, and compares these data structure values with the values in the fields 317 and 319 of the request 315. Based on this comparison, the software thread 381 determines a candidate virtualized storage pool. This candidate virtualized storage pool can include one or more storage appliances or/and one or more storage volumes (or LUNs) from at least one storage appliance that satisfy the values of the fields 317 and 319 in the request 315 and the constraints in the policies 198. The comparison software thread 381 can use known methods for reading the data structure values and for comparing the data structure values with the field values in a request.

The storage manager 310 determines the appropriate policies to compare with a request 315 by checking a field 321 (in the request 315) which specifies the storage management operation type that the server administrator desires to perform. For example, this storage management operation type that the server administrator desires to perform is to allocate some storage space amount from a storage appliance(s) to a host(s) that are managed by the server administrator. Other examples of storage management operation types are also discussed below. The storage manager 310 also determines the appropriate polices to compare with the request 315 by checking the fields 331*a*-331*e* in the policies 198*a*-198*e*, respectively. These fields 331*a*-331*e* indicate the storage management operation type that the constraints in the policies 198 are applicable with. For example, if fields 331*a*-331*e* indicate that policies 198*a*-198*e*, respectively, are to provide constraints to the storage management operation of storage space allocation from storage appliances to hosts and the field 321 in request 315 indicates that the server administrator desires to allocate storage space to the hosts, then the manager 310 will compare the values 317 and 319 with the values in the policies 198*a*-198*e*. Other examples of storage management operation types are discussed below (e.g., in FIG. 3C).

An identification output software thread 382 in the policy-based storage manager 310 then generates an identification 199 of the candidate virtualized storage pool. The identification output software thread 382 can use known methods for generating the identification 199 of the candidate virtualized storage pool. For example, the identification output software thread 382 can display the identification 199 in a screen in the user interface 196 (FIG. 2) of the management console 135. In the above example, the identification output software thread 382 will display the storage appliance 130(1) name (or other identity) in the candidate pool identification 199 as a candidate storage appliance that can allocate storage space for the host 105(1).

The above discussed software threads can be programmed by use of known software languages (e.g., C or C++) and known software programming techniques.

The server administrator can then select one or more storage appliances or/and one or more storage volumes (or LUNs) from at least one storage appliance, in the options that are shown in the identification 199, to provision the storage space from a storage appliance to the host. An example of a known method for provisioning the storage space of a storage appliance to a host has been discussed above.

Note that the decision to allocate storage space from a particular storage appliance (e.g., filer) are considered by the server administrator at the time of the storage provisioning. As mentioned above, the manager 310 generates the candidate virtualized storage pool identification 199 in response to the request 315 and based on the constraints in the policies 198. The server administrator can then selects the storage space in the storage appliance(s) from the candidates or options that shown in the identification 199. The server administrator will provision the selected storage space for a host by, for example, setting the igroups 322 as discussed above or by use of other suitable known storage provisioning methods or products. Once the storage space from a storage appliance(s) is provisioned for a host, the host will typically detect the storage appliances in the network 102 by performing standard device discovery of NAS (network-attached storage) or in SAN. The host can access the storage space that is provisioned to the host by, for example, by use of igroups 322 which permits or prevents the accesses of the host to storage spaces, as discussed above. The host can perform I/O requests (e.g., read and writes) to storage space that has been provisioned to the host.

As an example, after the storage space of a storage appliance(s) has been provisioned to the host 105(1), the storage appliance(s) can be discovered on the host 105(1) and are treated as a standard device on which I/O requests can be received and processed, as also mentioned above.

After the storage space of a storage appliance has been provisioned to a host (e.g., host 105(1)), a user of the host 105(1) can send snapshot management requests from the host to the storage appliance 130(1). Examples of snapshot management requests include known operations such as copying, deleting, restoring, or known operations to be performed on a data snapshot in a storage volume. Data snapshots are known to those skilled in the art and are described in, for example, the above-cited commonly-assigned U.S. Pat. No. 6,993,539.

Note that when the host 105(1) can perform I/O requests on the allocated storage space, the network administrator is no longer required to send requests 315 to the policy-based manager 310 in the management console 135.

As another example of a policy 198, the policy 198*b* may permit one or more host (e.g., host 105(2)) to be allocated storage space only in a storage space that use the fibre channel protocol (FCP). FCP is just one example of a possible interface protocol that may be specified as a constraint in the policy 198*b*. Data structure field 383 identifies the host 105(2) and the data structure field 384 indicates the value "FCP" which means that only storage space using FCP will be allocated to the host 105(2). Other network-related protocols may be set as constraints.

Assume that the storage appliance 130(2) is the only storage appliance that uses FCP. Data structure field 385 identifies the storage appliance 130(2) and the data structure field 386 indicates the value "FCP" which means that the storage appliance 130(2) uses FCP. If there are other storage appliances that uses FCP, then the data structure settings of the policy 198*b* will indicate these other storage appliances.

In the above example, the policy-based storage manager 310 will display the storage appliance 130(2) name (or other identity) in the identification 199 as a candidate storage appliance that can allocate storage space to the host 105(2). The server administrator can then provision the storage space in the storage appliance 130(2) to the host 105(2) by, for example, setting the igroup values in the storage appliance 130(2) as similarly discussed above.

As an option, a storage space monitor 350 (FIG. 3A) may be used to monitor the available storage space in a storage appliance and the storage space that has been allocated to a host. Storage space monitors are commercially available from various vendors. One example of a storage space monitor is the DATA FABRIC MANAGER® which is commercially available from Network Appliance, Incorporated. A policy 198*c* may permit a host to only be allocated, for example, a maximum of 50 gigabytes from each storage appliance (as set in the values in fields 387 and 388) or other limits on storage space size allocation. Assume that the network administrator has requested approximately 100 gigabytes (as set in field 317 of request 315) are to be allocated to the host 105(1). Due to the maximum 50 gigabytes of storage space amount per storage appliance that can be allocated to the host 105(1), as set in the values in the fields 387 and 388, the policy-based storage manager 310 can then identify, for example, the storage appliance 130(1) to allocate 50 gigabytes to the host 105(1) and the storage appliance 130(3) to allocate the remaining 50 gigabytes to the host 105(1). The storage appliances 130(1) and 130(3) are displayed as candidates in the identification 199. The server administrator can then provision 50 gigabytes from storage appliance 130(1) and 50 gigabytes from storage appliance 130(3) for the host 105(1).

As another example, the policy 198*d* may require a load balancing scheme so that storage space is allocated from a storage appliance that has the most amount of available (free) storage space (as indicated by field 389) to a host. For example, if storage appliance 130(3) has more storage space available than the other storage appliances 130(1)/130(2), then storage appliance 130(3) will be allocated to a host that needs storage space. The storage space monitor 350 provides, to the comparison software thread 381 of the manager 310, the information indicating the storage appliance that has the most amount of available storage space.

The policies 198 is also helpful in improving the Quality of Service (QoS) to the host. Improving the QoS includes, for example, improving the transmission rates and decreasing the error rates on the data transmission involving the host. Since the manager 310 can identify a storage appliance with the most available storage space for potential allocation to a host (e.g., in policy 198*d*) and set other constraints such as limiting the maximum storage space size per storage appliance for a host (e.g., in policy 198*c*), the manager 310 can identify optimal storage spaces that can be allocated to a host in order to improve the QoS to the host.

As another example, the policy 198*e* may require a round-robin scheme among the storage appliances (e.g., filers) (as indicated in field 390) where successive storage appliances (filers) are identified as candidates for allocating memory space to successive host. For example, the manager 310 will identify the storage appliances 130(1), 130(2), and 130(3) as candidates for providing storage spaces to the hosts 105(1), 105(2), and 105(3), respectively.

Additionally, the administrator can set a priority value to a policy. For example, the policies 198*a*-198*e* can have priority values that are set in data structure fields 391*a*-391*e*, respectively. Assume that the priority value "1" is the highest priority and that the priority value "5" is the lowest priority in the priority values in FIG. 3B. Therefore, the priority value "1" is higher in priority than the priority value "2" which is in turn higher in priority than the priority value "3". The policy 198*a* will have the highest priority (i.e., priority value "1") among the policies and the policy 198*e* will have the lowest priority (i.e., priority value "5") among the policies in the example of FIG. 3B.

In an embodiment of the invention, if two policies are contrary or in conflict with each other, then the manager 310 will compare the request 315 with the policy with the higher priority value and ignore any lower priority policy (or policies) that is in conflict with the higher priority policy, and then generate the candidate pool in the identification 199. In the example of FIG. 3B, assume that the request 315 indicates a storage space request of 100 gigabytes. Since the policy 198*a* is the highest priority policy, the manager 310 will identify the storage appliance 130(1) as a candidate in the identification 199. Since the lower priority policy 198*c* is in conflict with the policy 198*a*, the manager 310 will ignore the policy 198*c*. The manager 310 will comply with the other constraints in other policies that are lower in priority than the policy 198*a*, if these other constraints are not in conflict with the constraints in the policy 198*a*.

In the example of FIG. 3B, the management request 315 is a request to provision storage space to a host from a virtualized storage pool formed by the storage appliances 130. As mentioned above, the value 321 in the request 315 determines the specified storage management operation type, which is storage allocation in the example of FIG. 3B. However, in FIG. 3C, another embodiment of the invention permits the administrator to use other types of storage management operation types, where the administrator is not required to input (into the management console 135) an identity of any of the storage appliances 130. For example, the request 392 may be a request to delete storage space for a host 105 (i.e., to place disks of the storage space in a spare disk pool), to resize (decrease or increase) storage space allocated to a host 105, or to take the storage space offline (i.e., to disconnect the storage appliance 130(2) from the network 102), or to create or restore a snapshot(s) of data in the allocated storage space or to restrict snapshot management requests from a host to a particular storage space (e.g., storage volume). The request 392 will have a field 393 indicating the host identity and a field 394 indicating the specified storage management operation type that the server administrator wishes to perform. As an example, if the field 394 indicates an operation to resize the storage space allocated to the host 105(3), then the manager 310 can parse the request 392 and compare the values in the request 392 with values in the policies 395. As similarly discussed in the example of FIG. 3B, the storage manager 310 detects in the policy 395a has a value 357 that indicates that the constraints in the policy 395a is to be applied to resize operations of storage spaces that is allocated to hosts. Therefore, the storage manager 310 will use the policy 395a in a comparison with the values in the request 392, due to the value 357 in the policy 395a. Assume that the policy 395a has a field 396 that identifies the host 105(3) and a field 397 that permits the resize of storage space that is allocated to the host 105(3). The manager 310 will show the storage appliance 130(2) in the identification 199 as a candidate that satisfies the request 392 based on the policies 395. Therefore, the policies 395 provide constraints to the operation type that is indicated in the field 394 of the request 392. Based on the constraints in the policies 395 for the operation type in field 397, the manager 310 generates the identification 199 that indicates the storage appliances or storage space that can be used for the operation type in field 394. As mentioned above, the storage management operation type in field 394 can include, but are not limited to, various known storage management operations such as, e.g., deleting storage space for a host 105 (i.e., to place disks of the storage space in a spare disk pool), to resizing (decreasing or increasing) storage space allocated to a host 105, or taking the storage space offline (i.e., to disconnecting the storage appliance 130(2) from the network 102), or to creating or restoring a snapshot(s) of data in the allocated storage space or to restricting snapshot management requests from a host to a particular storage space (e.g., storage volume), or other known storage management operation types. Additional details on snapshots are also discussed further in the above cited U.S. Pat. No. 6,993,539. When the candidate pools are identified by the server administrator in the identification 199, the server administrator can then perform the steps in the desired storage management operation type. The steps in these operations types (e.g., deleting storage space or resizing (decrease or increase) storage space) can be performed in any suitable manner that are known to those skilled in the art and are typically performed in various commercially-available storage products.

Figure 3C:
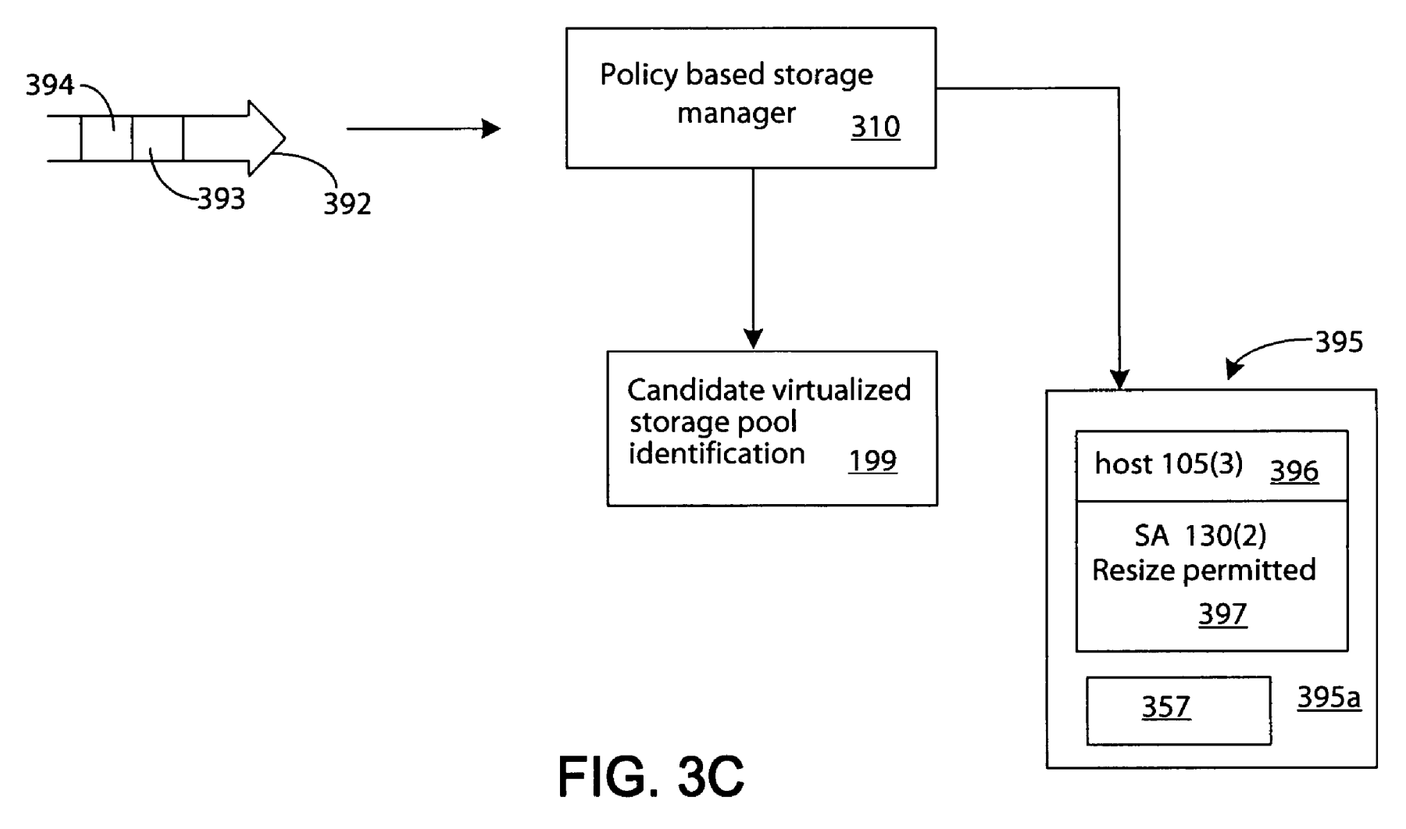
FIG. 3C is a block diagram that shows additional details of another embodiment of the invention.

Although only one policy 395a is shown in the example of FIG. 3C, additional policies may be checked by the manager 310 as similarly discussed in the example of FIG. 3B.

In the example of FIG. 3C, the administrator (e.g., the server administrator) can then reset the values in the igroup 322 in the storage appliance 130(2). For example, if the administrator will increase the size of storage space that is allocated to the host 105(3), the administrator can map one or more additional LUNs to the host 105(3) name in the igroup 322, so that the host 105(3) can access additional storage space. If the administrator will decrease the size of storage space that is allocated to the host 105(3), the administrator can un-map one or more additional LUNs from the host 105(3) name in the igroup 322, so that the host 105(3) will be able to access less storage space.

Other storage management operation types may require the administrator to previously know the storage appliance (filer) name, in previous systems. For example, a storage connect operation requires the administrator to have the knowledge of storage appliance names and storage appliance volumes. The storage connect operation and disconnect operation are performed in, for example, the SNAPDRIVE® tool which is commercially available from NETWORK APPLIANCE, INCORPORATED. Assume that a particular storage space is mapped (allocated) to a host. A disconnect operation involves removing the mapping from a host to a storage appliance for that storage space. As a result, the host can no longer discover and access the storage space. However, the storage unit(s) (e.g., disk(s)) with the storage space) is not "destroyed" on the storage appliance (i.e., the storage units(s) is not placed in a spare disk pool), and is kept intact with the stored data. Similarly, a connect operation involves reconnecting that storage space to the host by remapping the storage space to that host. In a connect operation, the administrator was previously required to specify the storage appliance name and storage appliance volume in the connect operation command. The storage appliance name and storage appliance volume identifies the storage space to be remapped to the host. At the time of storage connect, in an embodiment of the invention, the manager 310 can now give the administrator the choice of storage space to use in the connect operation by providing in the identification 199 various relevant details such as, for example, identification of the candidate storage space pools such as the storage appliance name(s) for the storage space, LUN (or volume) name(s) in the storage appliance(s), disk group name(s), and file system name(s), as similarly discussed above. Therefore, the manager 310 can compare the requested storage space amount 317 (FIG. 3B) in a request 315 with policies 198, and then generate the identification 199 that indicates the storage appliance name(s), LUN (or volume) name(s), disk group name(s), and file system name (s) associated with storage space to be remapped to a host.

Figure 3D:
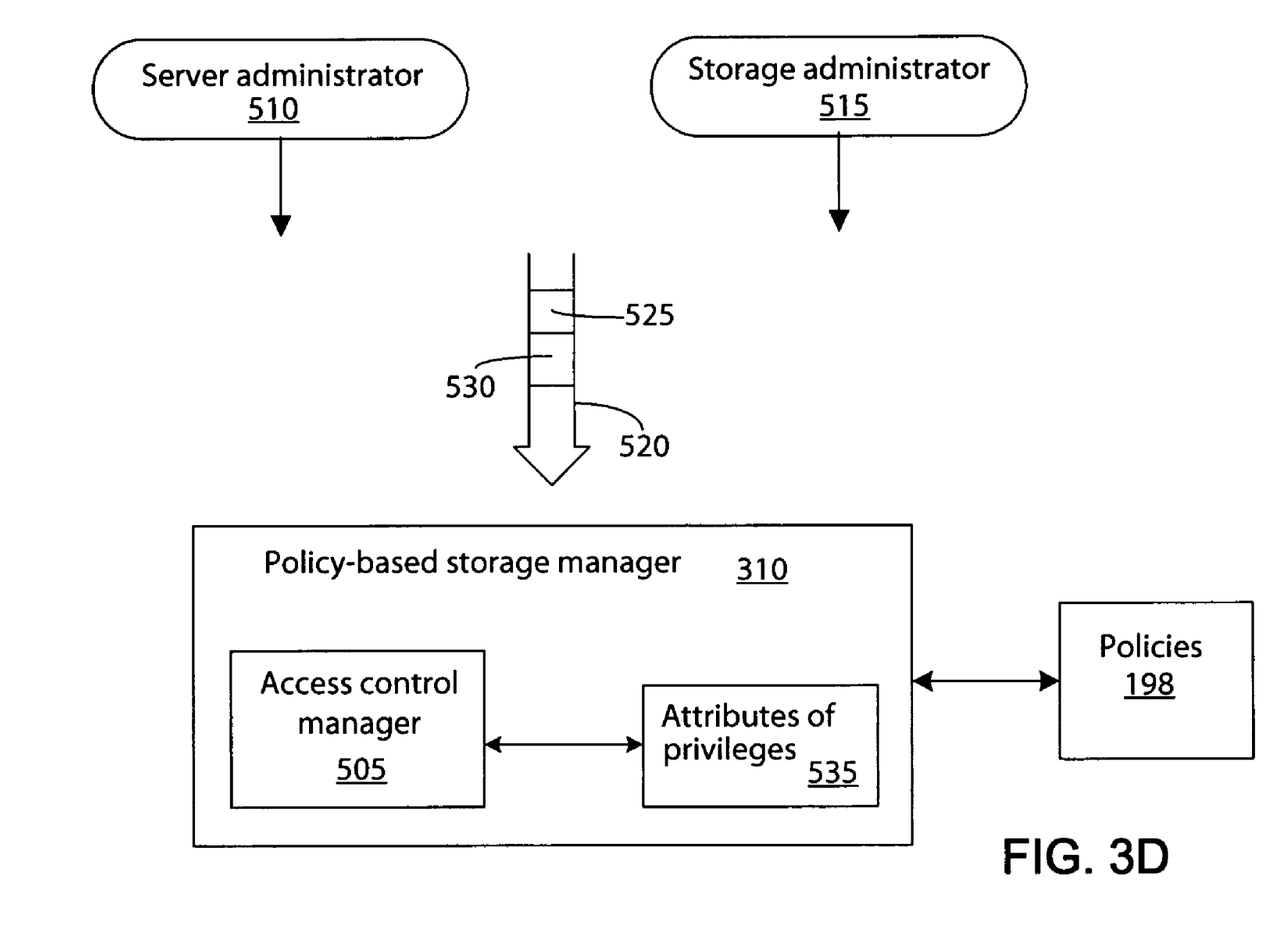
FIG. 3D is a block diagram that shows the access restrictions that the policy-based storage manager can place on a server administrator and on a storage administrator, in an embodiment of the invention.

FIG. 3D is a block diagram that shows the access restrictions that the policy-based storage manager 310 can place on a server administrator and on a storage administrator, in an embodiment of the invention. An access control manager 505 (which may be optionally integrated in or used with the storage manager 310) can recognize if a server administrator 510 or storage administrator 515 is sending a request 520 to the storage manager 310. The access control manager 505 is programmed to know the privileges of the server administrator 510 and storage administrator 515. In other words, the access control manager 505 knows the operations that are permitted and prevented for both of the server administrator 510 or storage administrator 515. Therefore, if a storage administrator 515 is logged into the management console 135, the access control manager 505 will permit this storage administrator 515 to modify/set or add policies 198 because the storage administrator 515 has the privilege of being able to modify/set or add policies 198. The access control manager 505 prevents a server administrator 510, who is logged in the management console 135, to modify/set or add policies 198.

If a server administrator 510 is logged into the management console 135, then the access control manager 505 can permit the server administrator 510 to, for example, send the commands 324 (FIG. 3A) from the storage manager 310 to igroups 322 in storage appliances 130 in order to perform the storage space allocation to the host(s) that is managed by the server administrator, because the server administrator has the privilege to allocate storage space to the host that he/she is managing.

The access control method that can be used by the access control manager 505 is, for example, a role based control access (RBC) method. As known to those skilled in the art, in computer systems security, RBAC is an approach to restricting system access to authorized users. The permissions to perform certain operations ("permissions" or "privileges") are assigned to specific roles. Various implementations of RBAC is used in commercially available products such as, for example, Microsoft Active Directory®, Security-Enhanced Linux (SELinux), and Oracle DBMS.

The roles in the example of FIG. 3D is the server administrator 510 and the storage administrator 515. Those role assignments acquire the permissions to perform particular system functions such as the ability to create or modify the policies 198 for the role of storage administrator 515.

The access control manager 505 can determine the role of the requester by checking the field 525 which indicates the role of the requester. The value in field 525 may be, for example, a login name and/or password of the requester or another type of identifier that identifies the role of a requester in an RBAC based system. The manager 505 also checks the field 530 to determine the operation being requested in the request 520. The manager 505 compares the fields 525 and 530 with the attributes 535 of privileges to determine if the requested operation will be permitted. The attributes 535 contain values that indicate the privileges of a server administrator 510 and a storage administrator 515. As an example, if a storage administrator has sent a command 520 to modify the policies 198, then that requested operation is permissible for the storage administrator and the access control manager 505 will not block the command 520. As a result, the storage manager 310 can process the command 520 and make the modification in the policies 198. In contrast, if a command 520 is not permitted, then the access control manager 505 will block the command 520 so that the storage manager 310 does not process the command 520.

Figure 4:
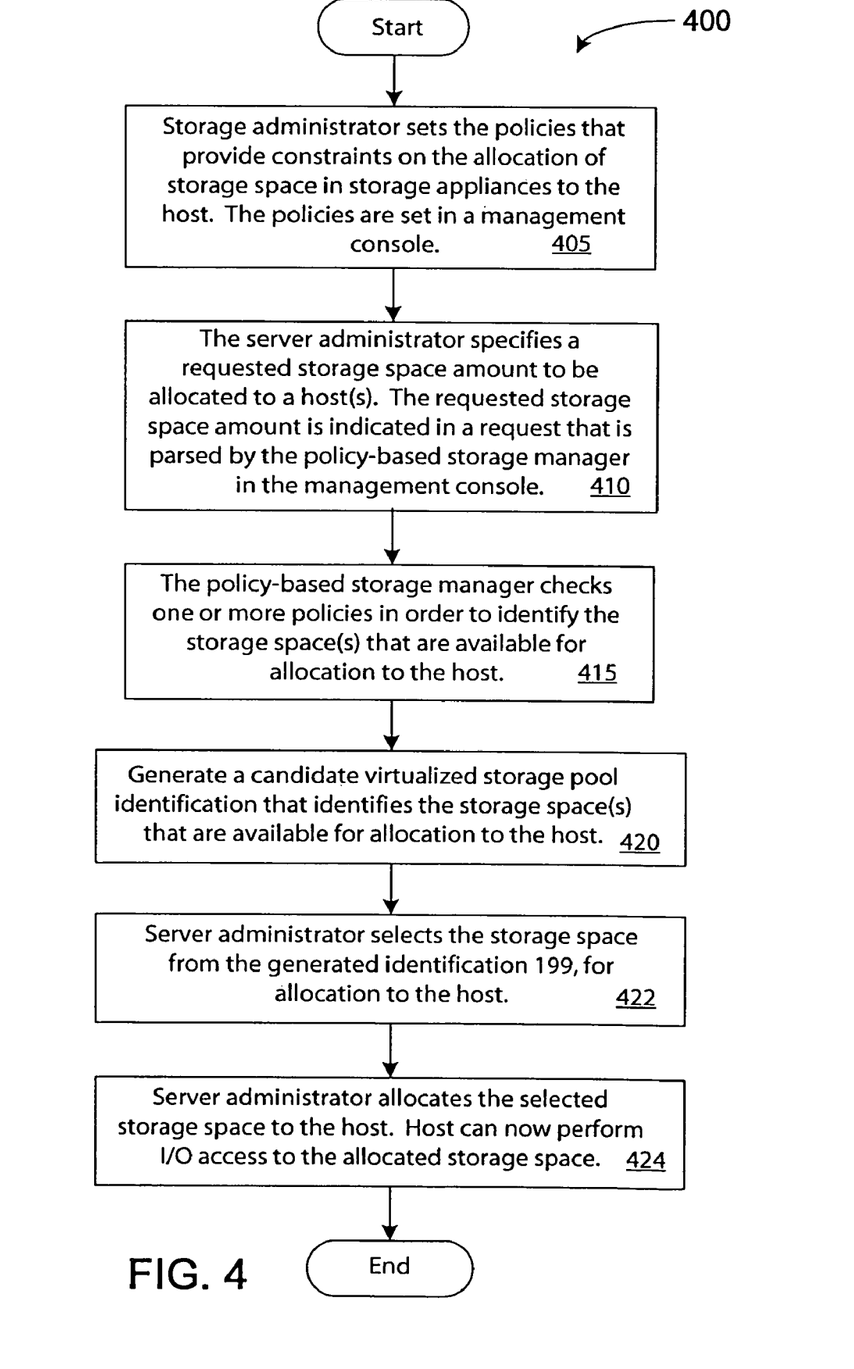
FIG. 4 is a flow diagram of a method in accordance with an embodiment of the invention.

FIG. 4 is a flow diagram of a method 400 in accordance with an embodiment of the invention. In block 405, a storage administrator can set the policies 198 that provide constraints on the allocation of storage space in storage appliances to the host(s) 105 in the system 100 (FIG. 1). The policies are set in a management console 135 by the server administrator. The number of policies may vary.

In block 410, a server administrator can specify a requested storage apace amount to be allocated to one or more hosts. In other embodiments, the server administrator specifies a different storage management operation type as discussed above. If the storage management operation type is for the allocation of storage space to a host, then the requested storage space amount is indicated in a request that is parsed by the policy-based storage manager 310 in the management console 135.

In block 415, the policy-based storage manager 310 checks one or more policies in order to identify the storage space(s) that are available for allocation to the host.

In block 420, the policy-based storage manager 310 generates a candidate virtualizes storage pool identification 199 that identifies the candidate storage space that are available for allocation to the host, based on the constraints in the policies 198.

In block 422, the server administrator selects the storage space from the generated identification 199, where the selected storage space will be allocated to the host.

In block 424, the server administrator will allocate the selected storage space to the host. Known methods for storage space allocation from a storage appliance to a host have been described above such as, for example, the use of igroups which permits or prevents the access of hosts to storage spaces. The host can now perform I/O access to the allocated storage space.

It is also within the scope of an embodiment of the present invention to implement a program or code that can be stored in a machine-readable medium to permit a computer to perform any of the methods described above. The various steps or methods, as discussed above, may be performed by software code in a software application, by modules that can be combined to create a larger software program or to allow for changes to be made to less than an entire program, or by use of other code implementations that are known to those skilled in the art.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for a policy-based storage appliance virtualization that identifies storage space based on a specified storage management operation type, the method comprising:
   specifying a specified storage management operation type in a request;
   checking one or more policies in a management console to identify storage space that can be used with the specified storage management operation type, where the storage space is provided by at least one storage appliance; and
   identifying the storage space that can be used with the specified storage management operation type, in response to checking the one or more policies.

2. The method of claim 1, wherein the specified storage management operation type comprises allocating storage space from the at least one storage appliance to a host.

3. The method of claim 2, further comprising:
   specifying a requested storage space amount to be allocated from the storage appliance to the host; and
   checking one or more policies in the management console and comparing the requested storage space amount and identity of the host with the policies, so that the management console identifies a candidate storage space that can be allocated from the at least one storage appliance to the host.

4. The method of claim 1, further comprising:
generating a candidate virtualized storage pool identification that identifies a candidate storage space that can be used with the specified storage management operation type.

5. The method of claim 4, wherein the candidate virtualized storage pool identification comprises a name of at least one storage appliance.

6. The method of claim 4, wherein the candidate virtualized storage pool identification comprises a name of at least one storage volume and a name of each storage appliance associated with the at least one storage volume.

7. The method of claim 1, wherein a policy sets a constraint on the specified storage management operation type.

8. The method of claim 7, wherein the constraint comprises:
allocating storage space on a particular storage appliance for a host.

9. The method of claim 7, wherein the constraint comprises:
allocating storage space on a particular storage volume in the at least one storage appliance.

10. The method of claim 7, wherein the constraint comprises:
allocating storage space on a particular storage appliance for a host, where the particular storage appliance supports a particular network-related protocol.

11. The method of claim 7, wherein the constraint comprises:
allocating storage space on a particular storage appliance for a host, where the particular storage appliance is set to a limit on storage space size allocation.

12. The method of claim 7, wherein the constraint comprises:
allocating storage space on particular storage appliances to achieve load balancing among the storage appliances.

13. The method of claim 7, wherein the constraint comprises:
allocating storage space on particular storage appliances by selecting storage space among a plurality of storage appliances based on a round-robin scheme among the plurality of storage appliances.

14. The method of claim 1, further comprising:
restricting a modification of a policy in the management console by an administrator, based on a role of the administrator.

15. The method of claim 1, further comprising:
restricting an addition of a policy in the management console by an administrator, based on a role of the administrator.

16. The method of claim 1, further comprising:
restricting the allocation of storage space to a host by an administrator, based on a role of the administrator.

17. The method of claim 1, wherein the specified storage management operation type is selected from a group consisting of:
deleting storage space allocated to a host;
resizing the storage space allocated to the host;
disconnecting the storage space allocated to the host;
creating a snapshot of data in the storage space;
restoring the snapshot of data in the storage space; and
restricting a snapshot management request from the host to some storage space allocated to the host.

18. An apparatus for a policy-based storage appliance virtualization that identifies storage space based on a specified storage management operation type, the apparatus comprising:
a management console configured to receive a request that specifies a specified storage management operation type and configured to check one or more policies in the management console to identify storage space that can be used with the specified storage management operation type, where the storage space is provided by at least one storage appliance and configured to identify the storage space that can be used with the specified storage management operation type, in response to checking the one or more policies.

19. The apparatus of claim 18, wherein the specified storage management operation type comprises allocating storage space from the at least one storage appliance to a host.

20. The apparatus of claim 19, wherein the request includes a requested storage space amount to be allocated from the at least one storage appliance to the host; and
wherein the management console checks one or more policies in the management console and compares the requested storage space amount and identity of the host with the policies, so that the management console identifies a candidate storage space that can be allocated from the storage appliance to the host.

21. The apparatus of claim 18, wherein the management console generates a candidate virtualized storage pool identification that identifies a candidate storage space that can be used with the specified storage management operation type.

22. The apparatus of claim 21, wherein the candidate virtualized storage pool identification comprises a name of at least one storage appliance.

23. The apparatus of claim 21, wherein the candidate virtualized storage pool identification comprises a name of at least one storage volume and a name of each storage appliance associated with the at least one storage volume.

24. The apparatus of claim 18, wherein a policy sets a constraint on the specified storage management operation type.

25. The apparatus of claim 24, wherein the constraint comprises:
allocating storage space on a particular storage appliance for a host.

26. The apparatus of claim 24, wherein the constraint comprises:
allocating storage space on a particular storage volume in the at least one storage appliance.

27. The apparatus of claim 24, wherein the constraint comprises:
allocating storage space on a particular storage appliance for a host, where the particular storage appliance supports a particular network-related protocol.

28. The apparatus of claim 24, wherein the constraint comprises:
allocating storage space on a particular storage appliance for a host, where the particular storage appliance is set to a limit on storage space size allocation.

29. The apparatus of claim 24, wherein the constraint comprises:
allocating storage space on particular storage appliances to achieve load balancing among the storage appliances.

30. The apparatus of claim 24, wherein the constraint comprises:
allocating storage space on particular storage appliances by selecting storage space among a plurality of storage appliances based on a round-robin scheme among the plurality of storage appliances.

31. The apparatus of claim 18, further comprising:
an access control manager configured to restrict a modification of a policy in the management console by an administrator, based on a role of the administrator.

32. The apparatus of claim 18, further comprising:
an access control manager configured to restrict an addition of a policy in the management console by an administrator, based on a role of the administrator.

33. The apparatus of claim 18, further comprising:
an access control manager configured to restrict the allocation of storage space to a host by an administrator, based on a role of the administrator.

34. The apparatus of claim 18, wherein the specified storage management operation type is selected from a group consisting of:
deleting storage space allocated to a host;
resizing the storage space allocated to the host;
disconnecting the storage space allocated to the host;
creating a snapshot of data in the storage space;
restoring the snapshot of data in the storage space; and
restricting snapshot management requests from the host to some storage space allocated to the host.

* * * * *